Patented Apr. 19, 1949

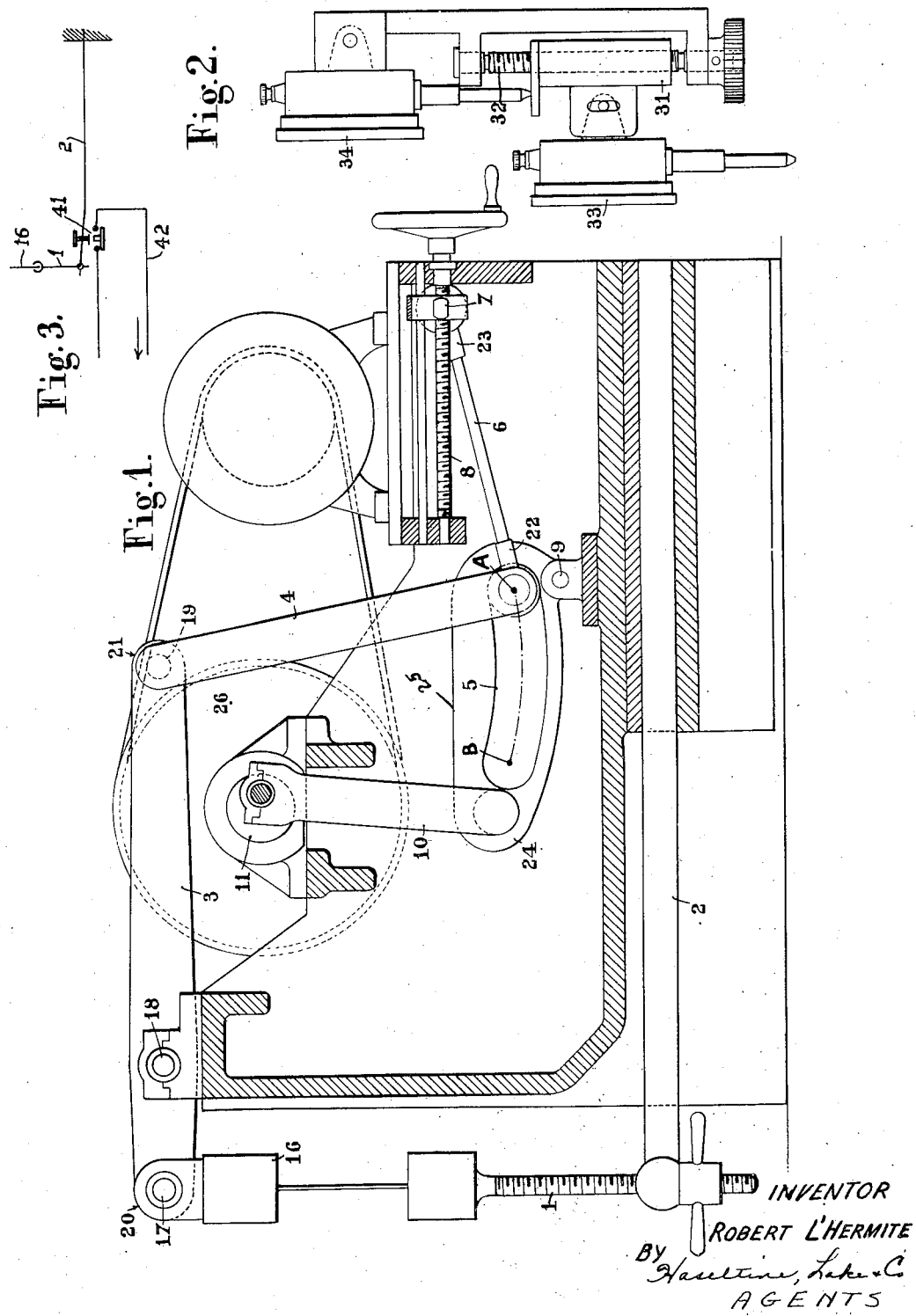

2,467,677

UNITED STATES PATENT OFFICE 2,467,677

FATIGUE MACHINE FOR TESTING MATERIALS SUBMITTED TO ALTERNATED OR REPEATED TENSILE STRESSES

Robert L'Hermite, Paris, France, assignor to Groupement Francais pour le Developpement des Recherches Aeronautiques, Paris, France, an endowed institution of France Application November 16, 1945, Serial No. 629,022
In France November 20, 1944

6 Claims. (Cl. 73—92)

The main feature of this fatigue machine for testing materials is that all the adjustments, notably the measurement and adjustment of the amplitude of the vibrations imposed upon the test-piece, can be performed while the machine is in operation.

Fig. 1 shows a machine according to the invention.

Fig. 2 shows an arrangement for the measurement of the stress.

Fig. 3 shows an automatic command to stop the machine.

A vibratory motion is applied to the head 16 of the test-piece 1, and the stress on the latter is measured with the aid of a dynamometric spring 2 arranged in series therewith (Fig. 1).

The test-piece head 16 is acted on by one end 20 of a lever with a 1:3.5 ratio whose three pivots 17, 18, 19 are mounted in needle bearings while the other lever end 21 is connected with a link 4 whose free end can be moved along a curved slideway 5 provided in a pivoted arm 25 the radius of which slideway is equal to the length of the link 4; the position of said link is defined by a pair of rods 6 whose ends 22, 23 are connected on one hand with link 4 and on the other hand with a nut 7 that can be displaced in parallel motion by the actuation of the worm spindle 8.

The pivoted arm 25 is fulcrumed to the stationary pin 9 mounted in needle bearings; the movable end 24 is acted on by a rod 10 actuated by a crankshaft 11 carried in a pair of ball bearing pedestals. Keyed on said crankshaft is a flywheel 26 intended to cushion the cyclic irregularities of the moving system. Said flywheel also serves as a pulley and is driven by the motor through a suitable reduction gear.

Through the provision of the pivoted arm provided with a slideway it becomes possible, simply by displacing point A along the slideway by means of the worm-spindle 8, to vary the amplitude of the variations in the load upon the test-piece; maximum amplitude is obtained at point B, and all the positions between the two said points can be obtained easily.

A measurement of the stress is obtained by ascertaining the deformations of spring 2 by means of a device composed of a pair of comparators and illustrated in Fig. 2.

A small carriage 31 controlled by a worm spindle 32 carries the one comparator 33; the displacements of said carriage 31 and consequently of the point of the comparator 33 are measured with the aid of the other comparator 34.

In the operation of the machine, as the carriage 31 is displaced and the point of the comparator 33 comes just into engagement with the spring, the pointer of comparator 33 jolts violently, which allows accurately to ascertain the extreme position of the spring.

A device is provided for automatically stopping the machine when the test-piece breaks.

As shown in Fig. 3 such device comprises a contact 41 which closes when the spring is back to its position of balance; said contact controls by the electric circuit 42 a small relay not shown which in turn controls a circuit-breaker not shown. Said device serves also to protect the motor against overintensities and overloads.

Moreover, the machine can operate only provided a test-piece is mounted therein.

What I claim as my invention and desire to secure by Letters Patent is:

1. A machine for testing materials submitted to alternated or repeated tensile stresses comprising a spring, a lever oscillated about a fixed point, means connected to said spring and said lever for tensioning the test piece therebetween, a pivoted arm provided with a slideway oscillated about another fixed axis, means to impart to said pivoted arm an angular motion of constant amplitude, an articulation adjustable in said slideway of said pivoted arm, a link connecting said lever to said articulation and means to adjust the point of articulation of said link in said slideway of said pivoted arm as desired for the purpose of adjusting the amplitude of oscillation of said lever.

2. A machine for testing materials submitted to alternated or repeated tensile stresses comprising a spring bar one end of which is set in a fixed support, a lever oscillatable about a fixed axis, means between which a test-piece can be tensioned one of which is pivoted on the other end of the spring bar and the other is pivoted on one end of said oscillatable lever, a pivoted arm provided with a curved slideway movable about a fixed axis, means whereby an oscillatory movement of constant amplitude can be imparted to said pivoted arm, an articulation adjustable in said slideway of said pivoted arm, a link connecting the other end of said lever to said pivoted arm and means whereby the position of the point of articulation of the link in the slideway of the pivoted arm can be adjusted along the latter.

3. A machine as claimed in claim 1 in which the slideway of the pivoted arm is curved on a radius equal to the length of the link connecting the articulation adjustable in the slideway of the pivoted arm with the lever.

4. A machine according to claim 3 in which the means to adjust the position of the point of articulation of the link in the slideway of the pivoted arm comprise a rotatable worm spindle, a nut cooperating with said worm spindle and a rod one end of which is pivoted on the nut and the other end of which is pivoted on the point of articulation of the link in the slideway of the pivoted arm.

5. A machine as claimed in claim 1 in which the means by which an oscillatory movement is imparted to the pivoted arm comprise a motor, a crank shaft actuated by said motor and a rod one end of which is pivoted on said crankshaft and the other end of which is pivoted on the free end of the pivoted arm.

6. A machine as claimed in claim 1 in which the means by which an oscillatory movement is imparted to the pivoted arm comprise a motor, a crank shaft actuated by said motor and a rod one end of which is pivoted on said crankshaft and the other end of which is pivoted on the free end of the pivoted arm and comprising a circuit-breaker designed automatically to cut-off the feed to said motor when the testpiece happens to break.

ROBERT L'HERMITE.

REFERENCES CITED

The following references are of record in the file of this patent:

UNITED STATES PATENTS

| Number | Name | Date |
| --- | --- | --- |
| 1,409,842 | Foster | Mar. 14, 1922 |
| 1,637,011 | Schopper | July 26, 1927 |
| 1,921,793 | Thelander | Aug. 8, 1933 |
| 2,154,277 | Moore | Apr. 11, 1939 |
| 2,215,958 | Fullerton | Sept. 24, 1940 |